April 2, 1968 R. D. BERG 3,375,857

APPARATUS FOR FEEDING AND FORMING ARTICLES

Filed June 18, 1965 3 Sheets-Sheet 1

INVENTOR
R.D.BERG
BY A.C. Schwarz, Jr.
ATTORNEY 3,375,857
Patented Apr. 2, 1968

3,375,857

APPARATUS FOR FEEDING AND FORMING ARTICLES

Richard D. Berg, Elmhurst, Ill., assignor to Western Electric Company, Incorporated, New York, N.Y., a corporation of New York Filed June 18, 1965, Ser. No. 465,030
12 Claims. (Cl. 140—71)

ABSTRACT OF THE DISCLOSURE

An apparatus feeds, forms, and inserts the leads of electrical components into preformed holes in an electrical circuit board. An intermittently moving pair of endless chains support and advance the components serially to a pair of notched discs which lift and transfer the components from the chains to a work station where a cutting member shears the leads aginst edges of the notches. A bending member is then operted to bend the sheared leads around a pivotal forming member, whereafter the bending member pivots the forming member out of position and inserts the leads into holes in the circuit board.

The present invention relates to an apparatus for feeding and forming articles, and more particularly to an apparatus for feeding electrical components and shearing and forming the leads thereof.

An object of the invention is to provide an improved apparatus for feeding and forming articles.

Another object of the invention is to provide mechanism for intermittently feeding electrical components having coaxially aligned leads and for shearing the leads to a predetermined length.

A further object of the invention is to provide a rotary device for intermittently advancing elongated articles and for supporting them while the ends are being sheared and including mechanism for locking the device against rotation during the shearing operation.

Apparatus illustrating certain aspects of the invention may include a pair of shearing discs mounted on a horizontally disposed drive shaft in axially spaced relation to each other and having aligned circumferentially spaced peripheral notches for receiving therein the leads extending from opposite ends of electrical components for supporting the components. A pair of parallel chains supported for horizontal movement and driven by the shaft have links for receiving the leads thereon and supporting the electrical components in laterally spaced relation to each other and for advancing the components into the notches in the shearing discs. A drive mechanism intermittently rotates the shaft to advance successive components to a work position in which the leads of the component engage a pair of arms of a pivoted forming member and are supported thereby below a pair of blades of a shearing member and below a pair of fingers of a bending member.

The shearing member is actuated by suitable mechanism and causes the shearing blades, in cooperation with the shearing discs, to shear the leads to a predetermined length. Thereafter, the bending member is actuated by another mechanism to cause the fingers thereof to bend the end portions of the leads downwardly about the arms of the forming member and to releasably retain the component in grooves in the fingers. Continued movement of the bending member effects the pivotal movement of the forming member and the disengagement thereof from the leads, after which the bending member carries the component downwardly and effects the transfer thereof to a circuit board supported therebeneath.

The drive mechanism for intermittently rotating the drive shaft includes a ratchet wheel on the shaft and a cooperable feed pawl mounted on a slide. The slide is reciprocated by an actuator and has a locking member which is moved into engagement with a pair of elements of the ratchet wheel to lock the shaft and the shearing discs against rotation during the shearing of the leads.

Other objects, advantages and novel aspects of the invention will become apparent upon consideration of the following detailed description, in conjunction with the accompanying drawings, in which.

Figure 1:
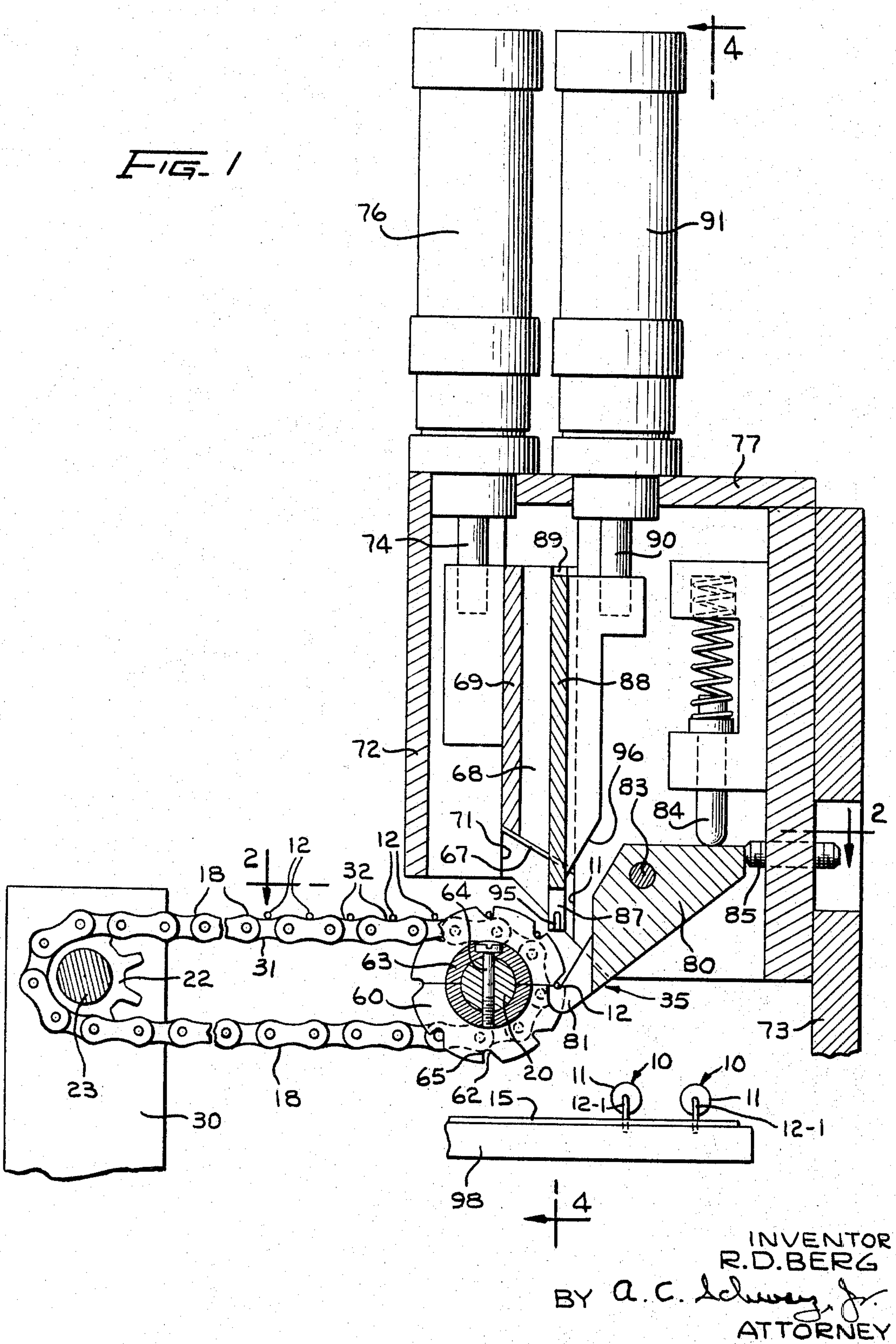
FIG. 1 is a fragmentary vertical sectional view of the apparatus embodying the present invention.

The present apparatus is designed to feed articles in the form of electrical components 10 (FIG. 2) of the type having a body 11 with a pair of coaxially aligned leads 12 extending from opposite ends thereof, to shear the leads 12 to a predetermined length, to bend the end portions 12–1 thereof (FIG. 4) at right angles, and thereafter to place the component onto a circuit board 15 with the ends of the leads inserted in apertures therein.

The apparatus comprises a pair of endless chains 18 (FIGS. 1, 2, 4 and 6) supported by a pair of sprockets 19 on a drive shaft 20 and a pair of sprockets 22 on a shaft 23. The drive shaft 20 is supported in bearings 25 and 26 in a bracket 27 and in a vertical frame plate 28, respectively (FIGS. 2 and 4), the latter of which is secured to and extends upwardly from a base (not shown). The shaft 23 is rotatably mounted in suitable supports 30 (FIG. 1) extending upwardly from the base.

The chains 18, spaced a predetermined distance apart, are of the roller link type, the links 31 of which have concave intermediate surfaces that form seats 32 (FIGS. 1 and 6) for receiving the leads 12 thereon and supporting the components 10 in uniformly spaced relation to one another. The components 10 may be manually or otherwise placed onto the upper flight of the horizontally disposed feed chains 18 and centralized thereon by suitable members (not shown).

Figure 2:
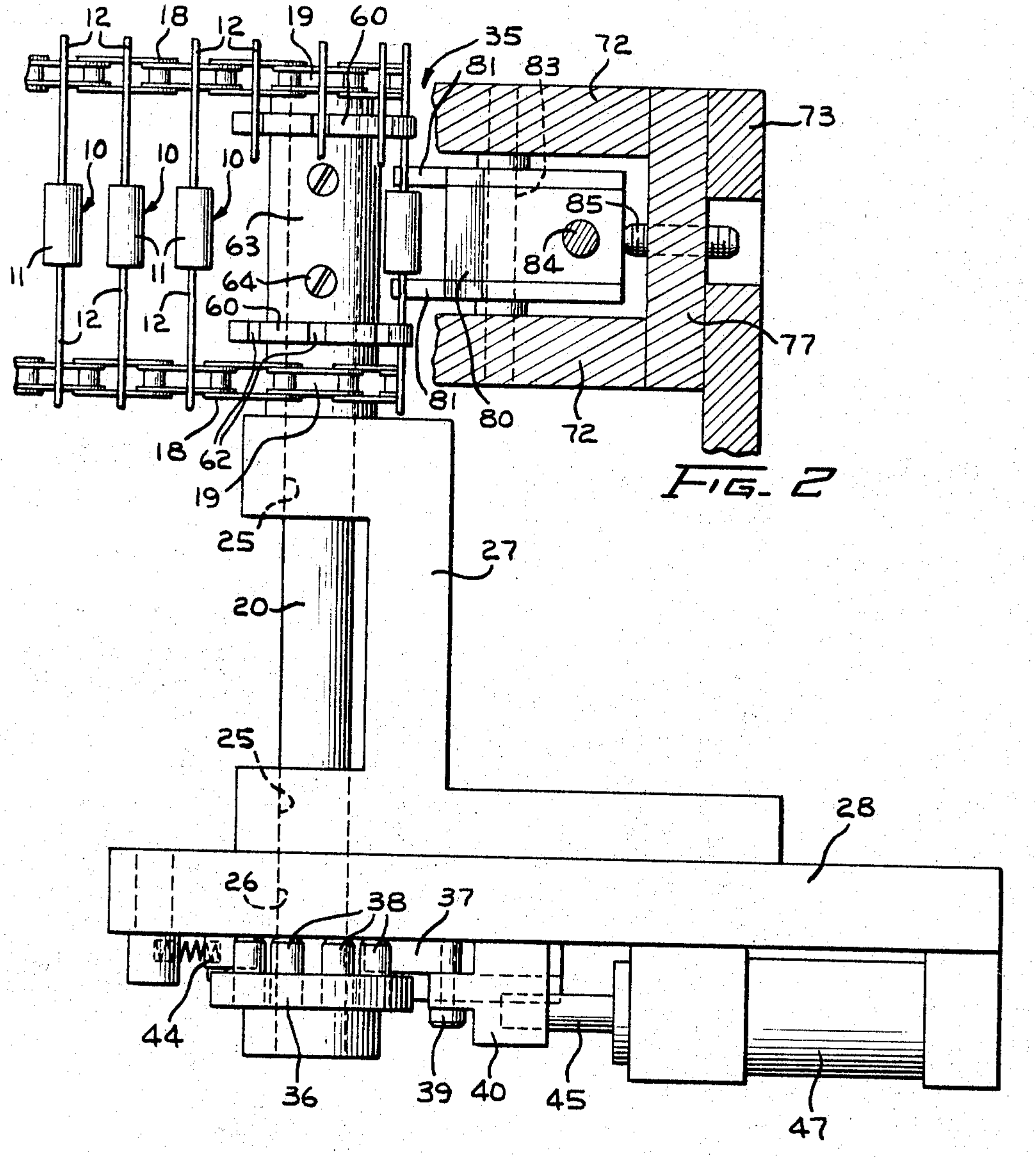
FIG. 2 is a fragmentary horizontal sectional view of the apparatus taken along the line 2—2 of FIG. 1.
Figure 3:
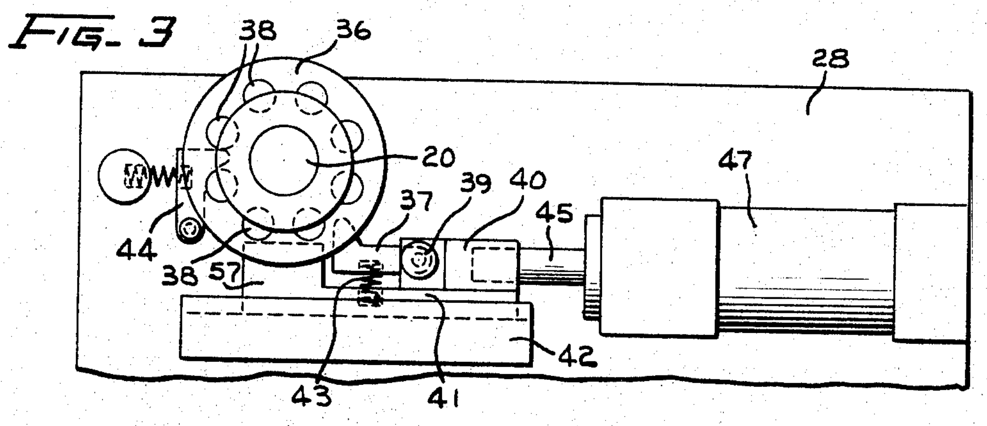
FIG. 3 is a fragmentary front elevational view of a portion of the intermittent drive mechanism of the apparatus.
Figures 4, 5, 6:
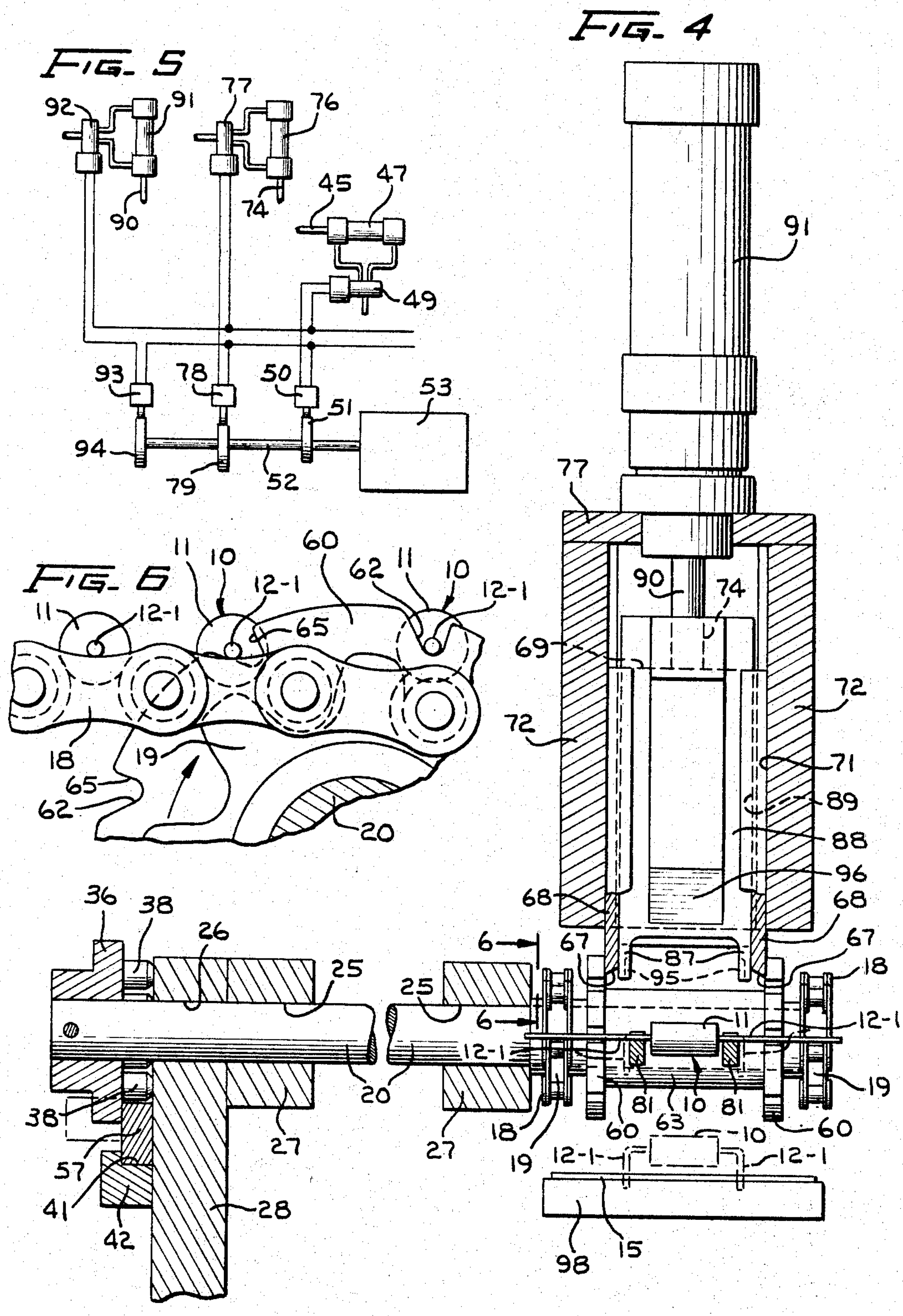
FIG. 4 is a fragmentary vertical cross-sectional view of the apparatus taken on line 4—4 of FIG. 1.
FIG. 5 is a diagrammatic view of the control mechanism for the apparatus.
FIG. 6 is an enlarged sectional view of a portion of the article conveying mechanism of the apparatus.

To actuate the chains 18 and advance the components 10 step by step to a work station 35 (FIGS. 1 and 2), the drive shaft 20 is driven by mechanism including a ratchet wheel 36 and a feed pawl 37 (FIGS. 2–4). The ratchet wheel is secured to the shaft 20 and has eight teeth or elements 38 in the form of parallel pins extending from the disc portion thereof in a circle and in a predetermined spaced relation to each other. The feed pawl 37 is pivotally connected at 39 to the head 40 of a slide 41 which is mounted for horizontal reciprocation in a guideway of a guide member 42 secured to the vertical frame member 28. A spring 43 urges the feed pawl 37 to a normal upper position as shown in FIG. 3. A spring-urged pivoted holding pawl 44 (FIG. 3) cooperates with the ratchet elements 38 to prevent reverse movement of the drive shaft 20 and the chains 18.

The slide head 40 is secured to a piston rod 45 of a fluid-operated actuator 47 which is mounted on the vertical frame plate 28. Reciprocation of the piston rod and the slide 41 is effected by the flow of compressed air to opposite ends of the actuator 47 under control of a solenoid-operated valve 49 (FIG. 5) and a switch 50. A rotary cam 51 mounted on a shaft 52 is provided with a predetermined contour for effecting the actuation of the switch 50 and the operation of the actuator 47 and the forward and return movement of the slide 41 at predetermined intervals during each rotation of the shaft 52. Suitable drive mechanism, indicated diagrammatically at 53, is provided for rotating the shaft 52 at a predetermined speed.

Extending upwardly from the slide 41 is a locking member 57 (FIGS. 3 and 4) having a flat upper surface which is adapted to engage the two lowermost ratchet elements 38 in response to the return movement of the slide 41 to the retracted position (FIG. 3) to lock the drive shaft 20 against rotary movement in either direction during the lead shearing operation. As the slide 41 advances during the forward movement thereof, the locking member 57 moves from one of the two lowermost ratchet elements 38 before the feed pawl 37 engages it and moves it to effect the indexing of the shaft 20 and the following component 10 to the work station. On completion of the indexing of the shaft 20, the two lowermost ratchet elements 38 are disposed in horizontally aligned relation to each other and in parallel relation to the path of movement of the slide and to the upper surface of the locking member 57 and in position for movement of the locking member thereunder in response to the return movement of the slide.

Mechanism for shearing the leads 12 to the predetermined length includes a pair of shearing discs 60 (FIGS. 1, 2, 4 and 6) which are secured to the drive shaft 20 and have eight peripheral notches 62 therein for receiving successive component leads 12. In the embodiment disclosed, the shearing discs 60 are formed integral with a tubular hub 63, the discs 60 and the hub 63 being split longitudinally and secured to the drive shaft 20 by screws 64. The notches 62 have cutting edges 65 which support the component leads 12 at the work station 35 and cooperate with shearing edges 67 on a pair of shearing blades 68 (FIGS. 1 and 4) to effect the shearing of the leads to the predetermined length. As shown in FIGS. 1 and 6, the notches 62 of the shearing discs 60 are spaced farther from the axis of the shaft 20 than the seats 32 of the chains 18 so that the components 10 are raised from the chains by the shearing discs and supported thereby at the work station.

The shearing blades 68 are mounted in a predetermined spaced and parallel relation to each other on a shearing member 69 which is mounted in guideways 71 of a hollow rectangular frame member 72. The frame member 72 is suitably supported on a vertical frame member 73 (FIGS. 1 and 2) extending upwardly from the base. The shearing member 69 is connected to a piston rod 74 of a fluid-operated actuator 76 that is fixedly secured to a horizontal upper plate 77 of the hollow frame 72. Reciprocation is imparted to the piston rod 74 and the shearing member 69 in timed relation to the operation of the actuator 47 by the admission of compressed air to opposite ends of the actuator 76 under control of a solenoid-operated valve 77, a switch 78 and a cam 79 on the cam shaft 52 (FIG. 5).

At the work station 35, the component 10 is supported by a forming element 80 which has a pair of arms 81 provided with seats engageable with the component leads 12 (FIGS. 1, 2 and 4). The forming element 80 is supported within the hollow frame member 72 for pivotal movement about a fixed pin 83 and is stressed for rotation by a spring-biased plunger 84 in a clockwise direction to a normal position, as indicated in FIG. 1, in which the element is stopped by an abutment 85. As disclosed in FIGS. 2 and 4, the arms 81 of the forming element are positioned between and spaced from the shearing discs 60 and support the leads 12 and the component 10 as the leads are being sheared.

On completion of the shearing of the leads 12 by the shearing discs 60 and the shearing member 69, the component 10 is supported on the arms 81 with the end portions 12–1 of the leads extending outwardly beyond the arms 81 and in the path of movement of a pair of forming fingers 87 of a vertically movable bending member 88.

The bending member 88 is mounted for vertical movement in guideways 89 formed in the shear blades 68 and is connected to a piston rod 90 of a fluid-operated actuator 91. The actuator 91 is fixedly secured to the plate 77 and is actuated in timed relation to the actuators 47 and 76 by compressed air under control of a solenoid-operated valve 92, a switch 93, and a cam 94 on the cam shaft 52. The bending member 88 is actuated in timed relation to the shearing member 68 so that during the first portion of the downward movement thereof and after the leads 12 have been sheared, the bending fingers 87 bend the end portions 12–1 of the leads vertically downwardly about the arms 81 of the forming element 80.

Shallow grooves 95 are formed in the bending fingers 87 for receiving the bent lead sections 12–1 and for releasably supporting the component 10 with the lower ends of the lead portions 12–1 projecting below the bending fingers 87. The bending member 88 is also provided with a cam 96 which, after the lead portions 12–1 are bent downwardly, serves to pivot the forming element 80 in a counterclockwise direction, as viewed in FIG. 1, to move the arms 81 of the forming element from the leads 12 and permit the bending member 88 to carry the component 10 downwardly to a predetermined position and insert the projecting lead ends 12–1 into apertures of the circuit board 15 positioned therebeneath.

The ends of the leads are then bent or otherwise secured to the board, after which the bending member 88 is raised to its normal upper position and the spring loaded forming element 80 is restored to its normal position as shown in FIG. 1.

A carrier 98 supports the circuit board 15 (FIGS. 1 and 4) and is actuated by mechanism (not shown) in timed relation to the operation of the actuators 47, 76 and 91 to advance the board 15 a predetermined distance for the attachment of successive components 10 thereto.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for trimming and bending a pair of leads extending axially from an article:

- a pair of feed discs having circumferentially and uniformly spaced notches for receiving and supporting a succession of pairs of leads extending from a succession of articles;
- a pair of spaced shearing means mounted for movement in a chordal path relative to said discs to cooperate with the inside surfaces of said discs to shear a pair of leads supported in a pair of notches;
- means extending between said discs for supporting each pair of sheared leads and the article;
- means movable in said chordal path and between said shearing means and said supporting means for bending each pair of sheared leads on said supporting means;
- means for advancing said discs to position each pair of leads in the chordal paths of movement of both said shearing means and said bending means; and
- means operative upon advance of each pair of leads into said chordal path for successively operating said shearing means and then said bending means.

2. In an apparatus for feeding articles and shearing the ends thereof, the combination of:

- a pair of discs mounted in axially spaced relation to each other for rotary movement about a horizontal axis and having circumferentially spaced notches with inner facing pairs of cutting edges ararnged in a circle about the axis for receiving and supporting the articles;
means for feeding the articles into said notches of said discs;
means for intermittently rotating said discs in timed relation to said article feeding means to advance said notches and the articles therein to a work station;
a cutting tool at the work station having a pair of shearing edges movable along a path tangent to said circle and cooperable with said inner facing pairs of cutting edges of said discs for shearing the articles; and
means for actuating said cutting tool in timed relation to said intermittently rotating discs.

3. An apparatus for feeding articles and shearing the ends thereof, which comprises:
a drive shaft mounted for rotation about a horizontal axis;
a pair of sprockets mounted on said shaft in axially spaced relation to each other;
a pair of link chains entrained around said sprockets;
means for supporting said chains for horizontal movement;
said chain links having concave edges engageable with the article at spaced points for supporting the articles in parallel and spaced relationship to one another;
a pair of shearing discs mounted on said shaft between said sprockets and said chains and having a plurality of aligned circumferentially spaced peripheral notches with cutting edges for receiving and supporting successive ones of the articles on said chains;
means for intermittently actuating said shaft to advance the notches and the article therein to a work station; and
means including a pair of shear members cooperable with said shearing discs for shearing the article.

4. An apparatus as defined in claim 3 in which said shearing discs serve to raise the articles from said chains and to support them at the work station.

5. In an apparatus for feeding electrical components and shearing the leads thereof, the combination of:
a pair of discs mounted in axially spaced relation to each other for rotary movement about a horizontal axis and having circumferentially spaced peripheral notches with inner facing pairs of cutting edges for receiving the leads and supporting the components;
means for feeding the components and positioning said leads into said notches of said discs;
means including a plurality of evenly spaced pins and a pawl for indexing said discs to advance said notches and the leads therein to a work station upon the engagement of one of said pins by the pawl;
a slide connected to said pawl, including a projecting member having an upper flat surface abutting a pair of said pins, to hold and lock said discs from movement;
means for reciprocating said slide to cyclically move said flat surface from said abutted pair of pins and to cyclically move said feed pawl to engage successive ones of said pins to alternately lock and index said discs; and
means at the work station cooperable with said cutting edges of said discs and operable in timed relation with said reciprocating means in a path intersecting the path of movement of the supported components to shear the leads thereof when said discs are locked from movement.

6. In an apparatus for feeding electrical components and shearing the leads thereof, the combination of:
a pair of horizontally disposed endless chains having links for receiving the component leads and supporting the components in a predeterinmed spaced relation to one another;
means including a drive shaft disposed adjacent to a work station for supporting said chains and the components thereon for intermittent movement through a predetermined path to a work station;
a pair of longitudinally split sleeves on said shaft having transversely extending flanges, said flanges forming discs having peripheral notches with cutting edges for receiving the leads and supporting them in the work stations;
means for securing said split sleeves to said drive shaft;
a cutting tool at the work station having a pair of shearing edges cooperable with said cutting edges of said discs for shearing the leads;
means for actuating said cutting tool; and
means for indexing said drive shaft in timed relation to the actuation of said cutting tool.

7. In an apparatus for feeding articles and shearing the ends thereof, the combination of:
a pair of horizontally disposed endless chains having links for receiving and supporting the articles in a predetermined spaced relation to one another;
means including a drive shaft disposed adjacent to a work station for supporting said chains and the articles thereon for intermittent movement through a predetermined path to a work station;
a pair of discs mounted on said shaft between said chains and having a plurality of aligned circumferentially spaced peripheral notches with cutting edges for receiving and supporting successive ones of the articles on said chains;
ratchet means for indexing said shaft to advance said discs having said notches and the articles therein to the work station;
means at the work station cooperable with said cutting edges of said notches for shearing the articles; and
means for locking said discs against rotary movement during the shearing of the articles.

8. In an apparatus for feeding electrical components and shearing the leads thereof, the combination of:
a pair of horizontally disposed endless chains having links for receiving the leads and supporting the components thereon;
means including a drive shaft for supporting said pair of chains and the components thereon for intermittent movement through a predetermined path to a work station;
a pair of annular shearing members fixedly mounted on said shaft and having circumferentially spaced peripheral notches with shearing edges for receiving the leads of the components as the latter are advanced by said chains;
cutting means at the work station cooperable with said shearing members for shearing the leads;
a ratchet wheel fixedly secured to said drive shaft and having a plurality of circumferentially spaced ratchet elements corresponding in number to said notches in said discs;
a slide mounted for movement along a fixed path transversely of said shaft and adjacent to said ratchet wheel;
actuating means for reciprocating said slide;
a feed pawl pivotally mounted on said slide and operable during the movement thereof in one direction for indexing said ratchet wheel and said shearing members to advance successive ones of said notches and the components therein to the work station;
means for actuating said cutting means in timed relation to the indexing of said shearing members; and
a member fixedly mounted on said slide and operable in response to movement of said slide in the other direction for engaging a pair of said ratchet elements on said ratchet wheel to lock said ratchet wheel against rotation during the shearing of the leads, and for releasing said ratchet elements and said ratchet wheel in response to movement of said slide in the one direction.

9. In an apparatus for feeding elongated articles and shearing the ends thereof, the combination of:

a drive shaft mounted for rotation about a horizontal axis;

a pair of annular shearing members fixedly mounted on said shaft and having circumferentially spaced notches with cutting edges for receiving the articles and supporting them at a work station;

means for feeding the articles into said notches of said shearing members;

drive means for indexing said shaft and said shearing members to advance the notches in said discs and the articles therein to the work station;

cutting means at the work station cooperable with the cutting edges of said shearing members for shearing the articles;

a ratchet wheel fixedly secured to said drive shaft and having a plurality of circumferentially spaced pins projecting therefrom parallel to and in a circle around said shaft and corresponding to said notches in said shearing members;

a slide mounted for movement along a fixed path transversely of said pins on said ratchet wheel and adjacent thereto;

actuating means for reciprocating said slide to and from first position and second positions;

a feed pawl pivotally mounted on said slide and operable during the movement thereof from the first position to the second position for indexing said ratchet wheel and said shearing members and advancing successive ones of said notches and the articles therein to the work station;

means for actuating said cutting means in timed relation to the indexing of said shearing members; and a member fixedly mounted on said slide and having a flat surface effective in response to movement of said slide to the first position for engaging a pair of said pins on said ratchet wheel and locking said ratchet wheel against rotation during the shearing of the article, and for disengaging said pins and releasing said ratchet wheel in response to movement of said slide to the second position.

10. In an apparatus for feeding and forming electrical components:

a horizontally disposed conveyor having means for receiving component leads and supporting the components in a predetermined spaced relation to one another;

a pair of discs mounted for rotary movement about a horizontal axis and having circumferentially spaced notches with cutting edges to receive the components in said notches, said notches being also spaced to correspond to said predetermined spaced relation of said components receiving means on said conveyor;

means for roating said pair of discs to lift the components from said conveyor and advance each lifted component to a work station;

shearing means at the work station rendered effective upon advance of each component and cooperable with said cutting edges of said notches for shearing the leads of the components to a predetermined length;

forming means of the work station for supporting the sheared components; and bending means cooperable with said forming means for bending the sheared leads of the components of said forming means.

11. An apparatus as defined in claim 10 wherein the conveyor comprises a pair of conveyor members positioned to span the pair of discs.

12. In an apparatus for feeding and forming electrical components, a pair of horizontally disposed spaced conveyors having means for receiving component leads and supporting the components in a predetermined spaced relation to one another;

a pair of discs, interposed between said conveyors, and mounted for rotary movement about a horizontal axis and having circumferentially spaced notches with cutting edges to receive the components in said notches, said notches being also spaced to correspond to said predetermined spaced relation of said component receiving means of said conveyors;

forming means at a work station interposed between said discs and mounted for pivotal movement about a horizontal axis;

means for rotating said pair of discs to lift the components from said spaced conveyors to advance each lifted component to said forming means to support each advanced component on said forming means;

shearing means at the work station cooperable with said cutting edges of said notches for shearing the leads of the components to predetermined lengths;

vertically movable bending means interposed between said discs and said forming means for bending the sheared leads of the components on said forming means, said bending means having a pair of vertical grooves for receiving the bent leads of the components;

means operable following operation of said shearing means for vertically moving said bending means to bend said sheared leads and position said bent leads in said vertical grooves; and camming means on said bending means rendered effective upon further vertical movement of said bending means for pivoting said forming means out of the path of said bending means.

References Cited

UNITED STATES PATENTS

| | | | |
|---|---|---|---|
| 2,777,477 | 1/1957 | Zimmerman | 140—71 |
| 2,929,289 | 3/1960 | Gorecki | 140—71 X |
| 1,546,914 | 7/1925 | Calkins | 10—169 X |
| 2,349,320 | 5/1944 | Wheeler | 146—81.5 |
| 2,877,845 | 3/1959 | Cameron | 83—267 X |
| 2,808,587 | 10/1957 | Hancock | 227—2 |

ANDREW R. JUHASZ, *Primary Examiner.*